United States Patent
Guo et al.

(10) Patent No.: US 10,284,067 B2
(45) Date of Patent: May 7, 2019

(54) LINEAR MOTOR

(71) Applicants: Shun Guo, Shenzhen (CN); Lubin Mao, Shenzhen (CN)

(72) Inventors: Shun Guo, Shenzhen (CN); Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 252 days.

(21) Appl. No.: 15/412,840

(22) Filed: Jan. 23, 2017

(65) Prior Publication Data

US 2018/0026509 A1 Jan. 25, 2018

(30) Foreign Application Priority Data

Jul. 21, 2016 (CN) .......................... 2016 1 0581188

(51) Int. Cl.
*H02K 1/17* (2006.01)
*H02K 1/34* (2006.01)
*H02K 5/04* (2006.01)
*H02K 33/18* (2006.01)
*H02K 33/16* (2006.01)

(52) U.S. Cl.
CPC ............... *H02K 33/18* (2013.01); *H02K 1/17* (2013.01); *H02K 1/34* (2013.01); *H02K 5/04* (2013.01); *H02K 33/16* (2013.01)

(58) Field of Classification Search
CPC ........ H02K 33/00; H02K 33/02; H02K 33/18; H02K 35/04; H02K 1/17; H02K 1/34; H02K 5/04; H02K 33/16; G08B 6/00; H04R 9/00; H04R 9/02

USPC ................ 310/12.14, 15, 17, 21, 25, 28, 29; 381/369, 412, 420, 421

See application file for complete search history.

(56) References Cited

U.S. PATENT DOCUMENTS

2011/0018364 A1* 1/2011 Kim ....................... H02K 33/18
310/17

FOREIGN PATENT DOCUMENTS

KR 20120033018 A * 4/2012

OTHER PUBLICATIONS

Machine translation of KR20120033018, Apr. 2012 (Year: 2012).*

* cited by examiner

*Primary Examiner* — Quyen P Leung
*Assistant Examiner* — Eric Johnson
(74) *Attorney, Agent, or Firm* — Na Xu; IPro, PLLC

(57) ABSTRACT

A linear motor includes a housing; a vibrating assembly arranged in the housing, the vibrating assembly including coils, a weight and a connecting piece connecting the coils with the weight; a magnet assembly connecting with the housing, the magnet assembly including a first magnet group and a second magnet group; a magnetic gap formed between the first magnet group and the second magnet group for at least partially receiving the coils; and an elastic connecting piece supporting the vibrating assembly in the housing elastically. The first magnet group and the second magnet group comprise at least one pair of magnets which are arranged oppositely to each other and have opposite magnetizing directions; and magnetizing directions of the magnets at the corresponding locations in the first magnet group and the second magnet group are the same.

5 Claims, 2 Drawing Sheets

LINEAR MOTOR

FIELD OF THE INVENTION

The invention is related to the technology of vibrators, and especially relates to a linear motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

A related linear motor comprises a housing, a magnet assembly arranged in the housing, a vibrating assembly and an elastic connecting piece supporting the vibrating assembly in the housing elastically, wherein the vibrating assembly comprises coils and a weight; the magnet assembly comprises a magnet and magnetic bowl or a side magnet; and a magnetic gap is formed by the magnet and the magnetic bowl jointly. One part of the coils is located in the magnetic gap and the coil shall implement reciprocating vibration with the weight in presence of ampere force upon being electrified. But the linear motor in relevant technology has the defects, such as small internal magnetic field in the magnetic gap, small magnetic drive force and low efficiency of magnetic circuit.

Therefore, it is necessary to provide an improved linear motor to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Figure 1:
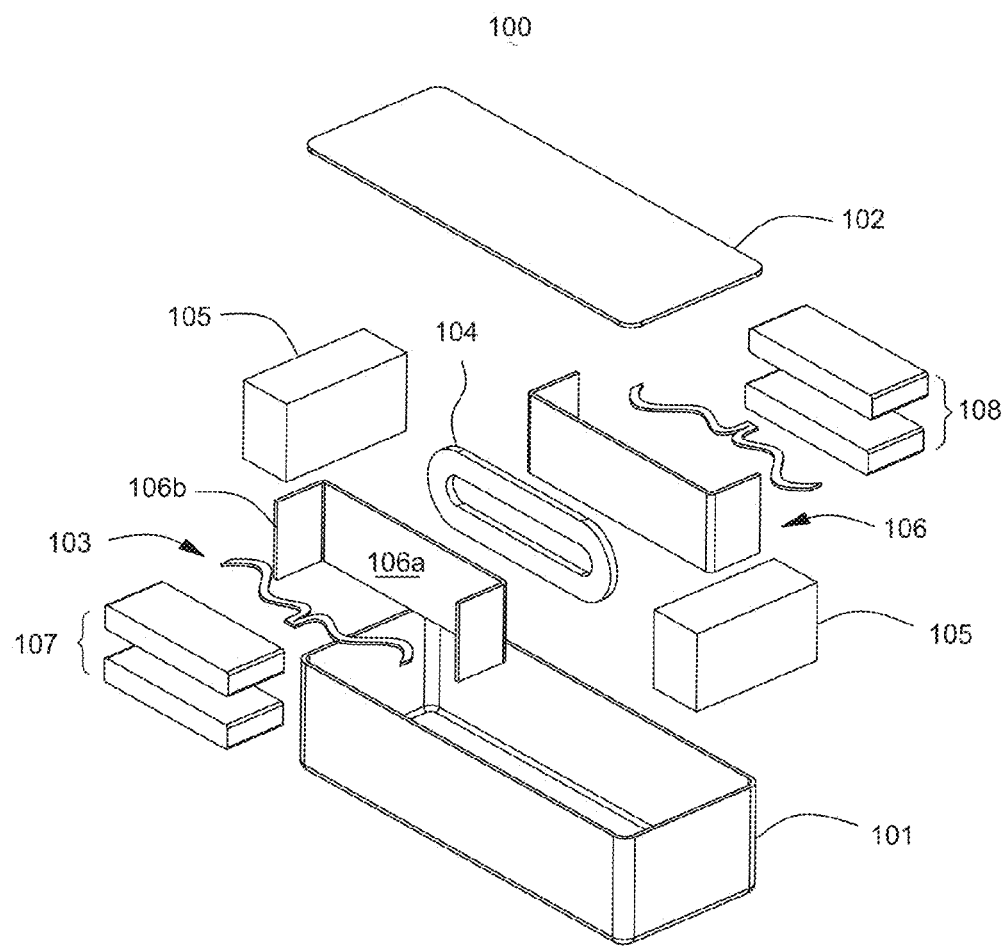
FIG. 1 is an exploded view of a linear motor in accordance with an exemplary embodiment of the present disclosure.
Figure 2:
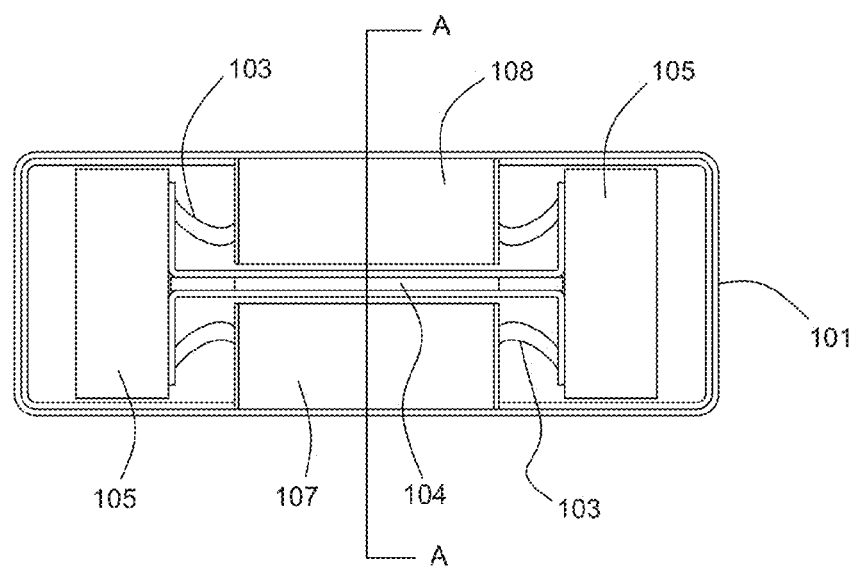
FIG. 2 is a top view of the linear motor in FIG. 1, wherein a cover plate thereof has been removed.
Figure 3:
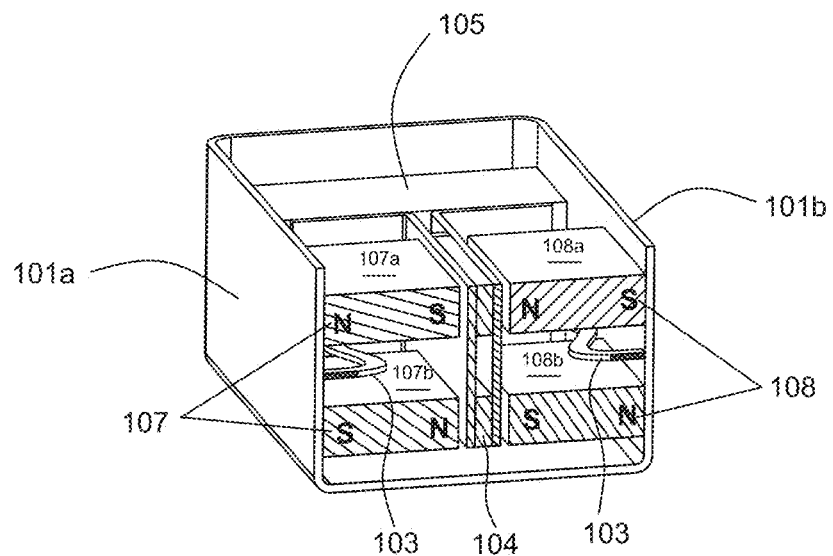
FIG. 3 is a cross-sectional view of the linear motor taken along line A-A in FIG. 2.

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

As shown in FIGS. 1-4, a linear motor 100 in accordance with an exemplary embodiment of the present disclosure comprises a housing, a vibrating assembly arranged in the housing, a magnet assembly connecting with the housing and an elastic connecting piece 103 supporting the vibrating assembly in the housing elastically.

The housing comprise a housing 101 whose one side is provided with an opening and a cover plate 102 connecting with the housing 101 and forming an accommodating space.

The vibrating assembly comprises coils 104, a weight 105 and a connecting piece 106 connecting the coils 104 and the weight 105, wherein the coils 104 are flat voice coils; the connecting piece comprises two connecting units 106 which are arranged symmetrically opposite to the plane where the coils 104 are arranged. Each of the connecting units 106 comprises a supporting plate 106a arranged in the magnetic gap and a bending board 106b extending from two ends of the supporting plate 106a in the bending way. Two connecting units 106 are arranged symmetrically, therefore, the whole connecting piece is in the I-shape. The an accommodation part for accommodating the coils 104 is formed among the gap between two supporting plates 106a, and the coils 104 is arranged in the accommodation part and connects with the supporting plate 106a. While a fixation part for fixing the weight 105 is formed by two bending boards 106b which are arranged on identical sides of two supporting plates 106a, and the weight 105 are fixed on two ends of the connecting piece, respectively.

In the embodiment, the connecting piece comprises two connecting units 106 which are arranged symmetrically. It is understandable the connecting piece can also be the part which has the accommodation part for fixing the coils and the fixation part for fixing the weight and is formed integrally in other embodiment possible. Specifically, the connecting piece has an accommodation hole for accommodating the coils; the coils are fixed in the accommodation hole; while two ends of the connecting piece have the fixation plane or the fixation part for fixing the weight.

Figure 4:
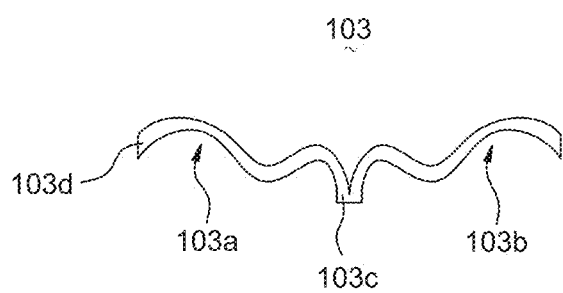
FIG. 4 is an illustrative view of an elastic connecting piece of the linear motor.

The magnet assembly comprises a first magnet group 107 and a second magnet group 108 which are arranged respectively on two sides of the plane where the coils are arranged. The gap among the first magnet group 107 and the second magnet group 108 refers to the magnetic gap where the coils 104 are arranged. As shown in FIG. 4, the first magnet group 107 and the second magnet group 108 comprise one pair of magnets which are arranged oppositely to each other and have opposite magnetizing directions; and the magnetizing directions of the magnets at the corresponding locations in the first magnet group 107 and the second magnet group 108 are identical. Specifically, the first magnet group 107 comprises one pair of magnets 107a and 107b with opposite magnetizing directions and fixed on the side wall 101a of the housing 101. The second magnet group 108 comprises one pair of magnets 108a and 108b with opposite magnetizing directions and fixed on the side wall 101b opposite to the side wall 101a. However, the magnet 107a in the first magnet group 107 has the magnetizing direction which is identical to that of the magnet 108a at the location corresponding to that of the magnet 107a in the second magnet group 108, while the magnet 107b in the first magnet group 107 has the magnetizing direction which is identical to that of the magnet 108b at the location corresponding to that of the magnet 107b in the second magnet group 108.

The magnetic field intensity in the magnetic gap is great because the coils 104 are arranged among the magnetic gap formed by the magnets having identical magnetizing direction, and the majority magnetic induction lines can pass through the coils vertically; therefore, the magnetic drive force is great, and the efficiency of the magnetic circuit is higher.

Two elastic connecting pieces 103 are arranged on two sides of the plane where the coils 104 belong to and arranged among two opposite magnets of the first magnet group 107 or the second magnet group 108. The elastic connecting piece 103 has a first elastic branch 103a and a second elastic branch 103b connecting with the first elastic branch 103a. The first elastic branch 103a and the second elastic branch 103b comprise a fixed end 103c connecting with the housing 101 and the a connecting end 103d extending toward the bending board 106b of the connecting unit 106 from the fixed end 103c, respectively. In this embodiment, the two fixed ends 103c are formed integrally. Moreover, the connecting ends 103d of the first elastic branch 103c and the second elastic branch 103d are connected with two bending boards 106b, respectively.

Further the first elastic branch 103a and the second elastic branch 103b are arranged symmetrically opposite to the fixed end 103c and are in the form of wave. The first elastic branch 103a and the second elastic branch 103b, which are in the form of wave, can improve the elastic restoring force of the elastic connecting piece 103. The coils 104 can generate the magnetic drive force with the magnet assembly after being electrified. Moreover, the vibrating assembly can implement reciprocating vibration in the housing in presence of the magnetic drive force and the elastic restoring force of the elastic connecting piece 103 because the magnet assembly is fixed on the housing.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear motor comprising:
a housing;
a vibrating assembly arranged in the housing, the vibrating assembly including a coil, weights and a connecting piece connecting the coil with the weights;
a magnet assembly connecting with the housing, the magnet assembly including a first magnet group and a second magnet group respectively arranged on two sides of a plane where the coil is arranged;
a magnetic gap formed between the first magnet group and the second magnet group for at least partially receiving the coil;
elastic connecting pieces supporting the vibrating assembly in the housing elastically; wherein
the first magnet group and the second magnet group comprise at least one pair of magnets which are arranged oppositely to each other and have opposite magnetizing directions; and magnetizing directions of the magnets at the corresponding locations in the first magnet group and the second magnet group are the same;
the connecting piece comprises an accommodation part arranged in the magnetic gap and fixation parts extending out of the magnetic gap from the accommodation part, the coil is accommodated in the accommodation part, and the weights are fixed on the fixation parts, and
the connecting piece comprises two connecting units which are arranged symmetrically opposite to the plane where the coil is arranged, each connecting unit comprises a supporting plate arranged in the magnetic gap and a plurality of bending boards respectively extending from two ends of the supporting plate, the accommodation part is formed by a gap between two supporting plates; the coil is arranged in the accommodation part and connected with the supporting plates, and the fixation parts are formed by two bending boards of the two connecting units arranged on identical sides of the supporting plates jointly.

2. The linear motor as described in claim 1, wherein each elastic connecting piece is arranged between two opposite magnets of one of the first magnet group or the second magnet group, and includes a first elastic branch and a second elastic branch.

3. The linear motor as described in claim 2, wherein the fixed ends of the first elastic branch and the second elastic branch are formed integrally.

4. The linear motor as described in claim 3, wherein the first elastic branch and the second elastic branch are arranged symmetrically opposite to the fixed end.

5. The linear motor as described in claim 4, wherein the first elastic branch is in the form of wave.

* * * * *